United States Patent
Guido

(10) Patent No.: US 10,194,321 B2
(45) Date of Patent: Jan. 29, 2019

(54) PERIODIC MOBILE FORENSICS

(71) Applicant: The MITRE Corporation, McLean, VA (US)

(72) Inventor: Mark D. Guido, McLean, VA (US)

(73) Assignee: THE MITRE CORPORATION, McLean, VA (US)

( * ) Notice: Subject to any disclaimer, the term of this patent is extended or adjusted under 35 U.S.C. 154(b) by 489 days.

(21) Appl. No.: 14/062,513

(22) Filed: Oct. 24, 2013

(65) Prior Publication Data

US 2015/0121522 A1    Apr. 30, 2015

(51) Int. Cl.
  G06F 21/55    (2013.01)
  G06F 21/56    (2013.01)
  H04L 29/06    (2006.01)
  H04W 12/12    (2009.01)

(52) U.S. Cl.
  CPC ............ *H04W 12/12* (2013.01); *G06F 21/55* (2013.01); *G06F 21/56* (2013.01); *H04L 63/145* (2013.01)

(58) Field of Classification Search
  CPC .......... G06F 21/51; G06F 21/56; G06F 21/52; G06F 21/53; G06F 21/54; G06F 21/565; G06F 21/566; G06F 21/57; G06F 21/575; G06F 21/64; G06F 21/645; G06F 21/55; H04W 12/12; H04L 63/145
  See application file for complete search history.

(56) References Cited

U.S. PATENT DOCUMENTS

| | | | |
|---|---|---|---|
| 6,981,114 B1 | 12/2005 | Wu et al. | |
| 7,877,801 B2 | 1/2011 | Repasi et al. | |
| 8,220,053 B1 | 7/2012 | Sun et al. | |
| 8,321,941 B2 | 11/2012 | Tuvell et al. | |
| 8,412,677 B2 | 4/2013 | Klose | |
| 8,484,347 B1 | 7/2013 | Gostev et al. | |
| 8,522,348 B2 | 8/2013 | Chen et al. | |
| 8,931,107 B1* | 1/2015 | Brandwine | 726/26 |
| 2008/0196104 A1 | 8/2008 | Tuvell et al. | |
| 2010/0138931 A1* | 6/2010 | Thorley et al. | 726/27 |
| 2011/0047621 A1* | 2/2011 | Brando | G06F 8/61 726/24 |

(Continued)

OTHER PUBLICATIONS

Andriotis, P. et al. "Forensic Analysis of Wireless Networking Evidence of Android Smartphones," *IEEE International Workshop on Information Forensics and Security*, Dec. 2-5, 2012, Tenerife, Spain: 6 pages.

(Continued)

*Primary Examiner* — Linglan E Edwards
*Assistant Examiner* — Forrest L Carey
(74) *Attorney, Agent, or Firm* — Morrison & Foerster LLP

(57) ABSTRACT

A forensics analysis is conducted on each of multiple mobile devices in an enterprise system to detect malicious activity. The systems and methods described include storing a single baseline image for the multiple mobile devices at a server. A client-side application on each mobile device scans storage locations to identify changes in data compared to a previous scan. At least a portion of the information about the changes is sent to the server. The server reconstructs snapshot images for each mobile device based on the baseline image and the received information. Malicious activity is detected by comparing the reconstructed snapshot image to a previous snapshot image for each mobile device.

16 Claims, 4 Drawing Sheets

(56) References Cited

U.S. PATENT DOCUMENTS

| | | | |
|---|---|---|---|
| 2012/0059794 A1 | 3/2012 | Wade et al. | |
| 2013/0124695 A1 | 5/2013 | Bookman et al. | |
| 2013/0339307 A1* | 12/2013 | Berstler | G06F 11/1453 707/654 |
| 2014/0279879 A1* | 9/2014 | McLean | 707/612 |
| 2015/0112939 A1* | 4/2015 | Cantwell | G06F 11/1451 707/646 |

OTHER PUBLICATIONS

Fairbanks, K. D. (2012). "An Analysis of Ext4 for Digital Forensics," *Digital Investigation* 9: S118-S130.

Grispos, G. et al. (Oct. 2012). "A Comparison of Forensic Evidence Recovery Techniques for a Windows Mobile Smart Phone," *University of Glasgow*, pp. 1-32.

Hoog, A. (2011). Chapters 5, 6, and 7 in *Android Forensics: Investigation, Analysis and Mobile Security for Google Android*. Waltham, MA: Syngress.

Li, J. et al. "Android Malware Forensics: Reconstruction of Malicious Events," *32nd International Conference on Distrivuted Computing Systems*, Jun. 18-21, 2012, Macau, China; pp. 552-558.

Pilli, E. S. (2010). "Network Forensic Frameworks: Survey and Research Challenges," *Digital Investigation* 7: 14-27.

Zhu, M. (2011). "Mobile Cloud Computing: Implications to Smartphone Forensic Procedures and Methodologies," *Auckland University of Technology*; 236 pages.

Guido, M. et al. (2013). "Automated Identification of Installed Malicious Android Applications," *Digital Investigation* 10: S96-S104.

Guido, M. D., "Detecting Maliciousness Using Periodic Mobile Forensics," *CERIAS Security Seminar*, Oct. 24, 2012, Purdue University, West Lafayette, Indiana; pp. 1-34.

Guido, M. D. et al. (Nov. 2012). "Automated identification of Installed Malicious Android Applications," The MITRE Corporation; 27 pages.

Namestnikov, Y. (Aug. 8, 2012). "IT Threat Evolution: Q2 2012," located at <http://www.securelist.com/en/analysis/204792239/IT_Threat_Evolution_Q2_2012> visited on Oct. 24, 2013. (11 pages).

* cited by examiner

PERIODIC MOBILE FORENSICS

FIELD

The present invention relates to conducting forensics analysis of mobile devices on an enterprise system. More specifically, the invention relates to systems and methods for detecting malicious activity on enterprise systems by reconstructing snapshot images of enterprise mobile devices at a remote server.

BACKGROUND

Enterprise systems have long relied on mobile devices that provide voice on carrier networks and funnel data through enterprise servers, such as BLACKBERRY ENTERPRISE SERVER (BES). BES provides secured communications by controlling user profiles and applications that may be installed on enterprise mobile devices. However, modern enterprise systems allow users to operate unsecured mobile devices with access to enterprise systems. These devices are becoming increasingly popular across all industries despite the limited ways to control or detect malicious activity on these types of mobile devices.

For example, Android smartphones are popular with users of enterprise systems because of their flexible platforms, despite the fact that data from Android smartphones is communicated over carrier networks, rather than being funneled through a BES. Android smartphones can use separate mobile device management software, but typically, the ability to download applications by users is not controlled by any BES-like server or service. Consequently, there is an inability by enterprise systems to control users from taking malicious actions on these types of mobile devices, or detect any malicious activity after the fact. Undetectable malicious activity in enterprise systems includes, for example, unintended application installations, and unauthorized users of the mobile devices that are masquerading as authorized users.

Malware in mobile devices is also becoming a significant problem for enterprise and individual users. For example, the amount of Android malware tripled in the second quarter of 2012 compared to the first quarter. See Y. Namestnikov, IT Threat Evolution: Q2 2012, SecureList, available at www.securelist.com/en/analysis/204792239/IT_Threat_Evolution_Q2_2012.

One approach to combat malware on enterprise mobile devices is to install a local virus scanner, much like an administrator would do on enterprise laptop or desktop computers. Mobile virus scanners run as similar privileged applications inside a virtual machine environment of a mobile device. Virus scanners compare installed applications against a known repository of malware signatures. That is, a virus scanner compares applications against a blacklist of known malicious applications. This technique has recognized weaknesses that are exploited by malware distributors. For example, a malicious application that is not in the blacklist is undetectable and could surreptitiously escalate privileges by modifying critical system files and altering mobile device behavior, rendering the virus scanner useless.

Thus, current security mechanisms for enterprise mobile devices can only detect malicious activity that has been previously identified as malicious, such as known malicious applications. Consequently, unknown malicious applications, unauthorized users, or malicious authorized users can readily take actions that potentially leave sensitive data exposed with little recourse for enterprise systems. Moreover, the risk of data loss inherently increases as more sensitive enterprise information becomes accessible over these types of mobile devices.

SUMMARY

Described herein are systems and methods for conducting forensics analysis of mobile devices of enterprise systems to detect malicious activity. The systems and methods allow organizations to determine when a compromise has occurred to a mobile device that is part of an enterprise system.

In some embodiments, a method for analyzing data on a mobile device includes scanning current data in memory on a mobile device. A processor is used to identify changes to the current data based on a previous scan, and store information about the changes to the current data at the mobile device. At least a portion of the information is sent to a server. The current data is reconstructed at the server based on the information and baseline data. Data is then analyzed by comparing the reconstructed current data to reconstructed data based on the previous scan.

In some embodiments, the baseline data is a single image for reconstructing current data of multiple mobile devices, and the baseline data is stored at the server before current data is scanned in the mobile device. In some embodiments, the information includes a series of changed bits and at least one of locations of the changed bits, and collection times of the changed bits.

In some embodiments, the reconstructed current data includes the baseline data overlaid and replaced by the series of changed bits. In some embodiments, the scanning is executed automatically periodically as a daemon process, and the sending of the information about the changes to the current data occurs periodically. In some embodiments, the current data is represented as hash values. In some embodiments, the current data includes file systems. In some embodiments, the analysis includes detecting malicious activity as changes to critical file systems. In some embodiments, the critical file systems are displayed on a display at the server based on the reconstructed file systems.

In some embodiments, a method for conducting an analysis of multiple mobile devices in an enterprise system includes a memory to store a single baseline image for multiple mobile devices. Information about changes to a current snapshot is received for each of the mobile devices. A processor is used for reconstructing the current snapshot for each of the mobile devices based on the single baseline image and the received information for each of the mobile devices. An analysis is conducted of each of the mobile devices by comparing the reconstructed current snapshot to a previous snapshot for each of the mobile devices.

In some embodiments, the snapshot is a record of exact contents of a storage location or file system in the mobile device at a given time. In some embodiments, the information includes a series of changed bits and at least one of locations of the changed bits, and collection times of the changed bits. In some embodiments, the series of changed bits is de-duplicated and stored at the server as hash values. In some embodiments, the information is automatically retrieved from each of the mobile devices periodically. In some embodiments, the current snapshot includes file systems and the analysis includes detecting malicious activity as changes to critical file systems. In some embodiments, each of the mobile devices includes an ANDROID operating system.

In some embodiments, a system for analyzing data on a mobile device includes a processor that scans current data in memory on a mobile device and identifies changes to the current data based on a previous scan. A memory location stores information about the changes to the current data at the mobile device. A server reconstructs the current data based on the information and baseline data, and compares the reconstructed current data to reconstructed data based on the previous scan.

In some embodiments, the baseline data is a single snapshot for reconstructing current data of each of multiple mobile devices. In some embodiments, the information includes a series of sequential bits with at least one changed bit and the reconstructed current data includes the baseline data overlaid by the series of sequential bits containing at least one changed bit.

In some embodiments, a system for analyzing mobile devices in an enterprise system includes a memory that stores a single baseline image for multiple mobile devices. A processor receives information about changes to a current snapshot for each of the mobile devices, reconstructs the current snapshot for each mobile device based on the single baseline image and the received information for each mobile device, and conducts an analysis of each mobile device by comparing the reconstructed current snapshot to a previous snapshot for each mobile device.

In some embodiments, the information includes a series of sequential bits containing at least one changed bit, at least one of multiple locations of the changed bits and collection times of the changed bits. In some embodiments, the series of changed bit is visualized at a server as ordered hash values.

BRIEF DESCRIPTION OF THE DRAWINGS

Exemplary embodiments of the invention will now be described with reference to the accompanying drawings, in which.

To facilitate understanding, identical reference numerals have been used, where possible, to designate identical elements that are common to some of the figures.

DETAILED DESCRIPTION

Figure 1:
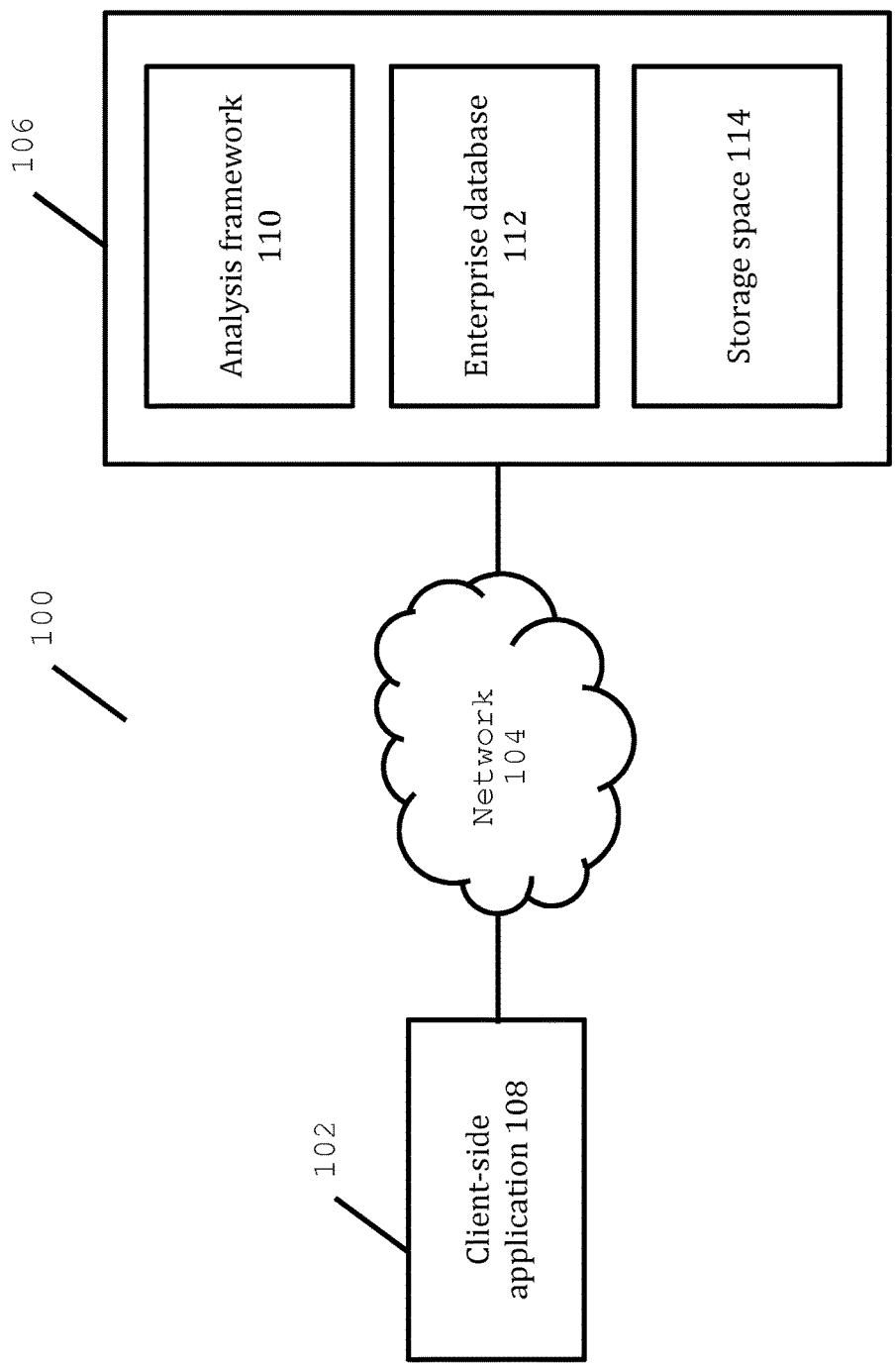
FIG. 1 illustrates components of the periodic mobile forensics architecture in an enterprise system, according to some embodiments.

Disclosed herein are periodic mobile forensics (PMF) methods and systems that apply digital forensic techniques to monitor and audit enterprise mobile devices. Forensics techniques examine digital media to identify, preserve, recover, analyze and present facts and opinions about the data contained on the storage media on mobile devices. Mobile devices may include mobile or smart phones, tablet or laptop computers, or any other device that is configured to operate as part of an enterprise system. The systems and methods ascertain malicious activity on mobile devices and ultimately improve enterprise monitoring.

Components of the PMF include mobile devices with a client-side application and a server that communicates with the mobile devices over a network. The server may include an analysis framework for executing detection techniques, an enterprise database for storing information used to reconstruct images of the mobile devices, and storage space for reconstructing forensic images, or snapshot images, of the mobile devices' storage. A snapshot image is a record of the contents of a storage location or file system at a given time.

The disclosed methods include a client-side application that periodically scans blocks of data stored and changing on storage locations of enterprise mobile devices. The client-side application for each mobile device identifies changes to the blocks of data and stores information about the changes locally on each mobile device. For example, the client-side application recognizes and stores changes to the boot.img of the device, which can indicate either a change to the device kernel or the underlying root file system.

At least a portion of the information obtained from a scan for each mobile device is sent to the server over a network. In some embodiments, forensic images of mobile devices are reconstructed based on a previous one-time forensic image combined with scan results sent to the server at different times. A forensic image is a bit-for-bit copy of data storage. In some embodiments, snapshot images of mobile devices are reconstructed based on a baseline image and other snapshot images collected at different times. A baseline image is a one-time logical or physical image of a target mobile device acquired before the target mobile device is distributed to an enterprise user. The analysis framework can then conduct automated forensic analysis of a mobile device given a time frame by examining the reconstructed forensic images or by comparing a reconstructed snapshot image to a previously reconstructed snapshot image from a previous time. A forensics analysis can include executing mechanisms that can detect changes to privileged areas of a mobile device and/or can include identify and determine added, deleted, and modified artifacts from the mobile device's file systems.

The systems and methods described herein are directed to mobile devices on enterprise systems. Detection techniques could be performed by enterprises to identify malicious activity affecting their mobile device infrastructure. The disclosed PMF can secure enterprise systems where mobile device users inadvertently or intentionally install malicious applications. PMF can be used on diverse types of mobile devices that are increasingly used in enterprise deployments. This is useful to modern enterprise systems that have Bring Your Own Device (BYOD) policies for users to operate a mobile device for both personal and work usage.

These systems and methods identify malicious use of mobile devices or malicious applications installed on the mobile devices. Malicious applications may be identified when they are installed or as they deliver malicious payloads. The systems and methods can detect malicious users of mobile devices by identifying events and patterns of events that indicate malicious behavior over time of a particular mobile device. For example, the systems and methods identify events and patterns of events that indicate when a particular mobile device is used by someone other than the owner of a mobile device.

Disclosed are techniques for securing mobile devices that overcome the deficiencies of conventional security approaches, such as mobile virus scanners. A problem with applying conventional security techniques to mobile devices is that mobile devices differ in significant ways from conventional desktop computers. Unlike conventional computers, mobile devices are sensor rich. For example, they include small screens with gesture-based user interfaces.

Unlike conventional computers, mobile devices remain powered on and keep persistent connections to commercial networks, are always with users, and are charged through USB ports. Thus, the battery life of mobile devices is a key constraint to any security technique. Unlike conventional computers, mobile devices use application containers, permissions and intents, restrict access to lower-level OS functions, which includes virus scanners, and their operating systems are sometimes tailored to specific devices and carriers.

Mobile devices tend to primarily use solid-state drives rather than disk drives. The types of data processed and stored on mobile devices are different than those stored on conventional computers, primarily because mobile devices are single-user devices that can be taken anywhere. For example, smartphones differ from conventional computers in the amount of sensitive data that they can contain, the methods and availability of applications, and the ability of a malware developer to repackage a benign application to distribute malware through trusted application repositories, such as app stores.

Network level monitoring approaches are typically not effective because mobile devices often operate outside the confines of an enterprise. The systems and methods described herein include robust ways of monitoring mobile devices for potentially malicious activities. Monitoring usage pattern and stored data of an enterprise mobile device can reveal unique information about users and their organizations to prevent malicious activity.

The described systems and methods can be utilized with substantially any mobile device and enterprise systems to detect malicious activity. In some embodiments, the systems and methods detect malicious applications that have been installed on a mobile device, detect malicious users that are authorized to use a particular mobile device, and detect masquerading users that are not authorized to use a particular mobile device. The described systems and methods can be readily embodied as a combination of software program modules that are integrated as parts of other programs. Different program modules may reside at a mobile device, a server, or across multiple computing resources, such as a cloud environment, in a network. Nevertheless, to simplify the following discussion and facilitate reader understanding, the description will discuss the PMF system in the context of use within software program modules that execute on mobile devices and a server to detect malicious activity on the mobile devices. The systems and methods disclosed are not limited to the embodiments detailed below, but can provide generalized forensics acquisition of most any mobile device.

I. Enterprise Environment

Components of a periodic mobile forensics (PMF) system are shown in FIG. 1. They include client-side application 108 that resides on each mobile device 102 of enterprise system 100. For the sake of brevity, FIG. 1 only shows a single mobile device 102. However, enterprise system 100 may include many mobile devices, which may include the same or different hardware and software components. Client-side application 108 runs a service on mobile device 102 to collect information about each mobile device 102. The PMF system also includes a server 106, which includes an analysis framework 110, enterprise database 112, and storage space for reconstructing images 114. These features may be components of the same server-side application on server 106, or may reside on different servers or distributed instances, such as cloud environments. Mobile device 102 communicates with server 106 over network 104. Analysis framework 110 executes a series of automated forensic processes. Enterprise database 112 stores information about each mobile device 102, including changed blocks of data and event data that is derived from forensic processes. Storage space 114 is used to reconstruct snapshot images of each mobile device 102 and those snapshot images are used by analysis framework 110 during its analytical processes.

The software program modules comprising the PMF can be stored on non-transitory computer readable mediums. The program modules can be executed by CPUs on mobile device 102 and server 106. Accordingly, an enterprise system may police its mobile devices 102 to identify malicious activity. Server 106 may be the same or different from servers operated by enterprise systems or carriers, such as VERIZON or AT&T. In these embodiments, an enterprise may pay for services that identify malicious activities on their mobile devices 102. In some embodiments, the PMF may be connected to a plurality of carriers to allow for detection of malicious activity in mobile phones belonging to enterprise systems across numerous carriers.

The described systems and methods detect unintentional or deliberate activity, such as installations of applications, on mobile devices 102 associated with an enterprise system 100. The mobile devices may have been distributed to an enterprise user population and have access to resources on the enterprise system 100. Malicious activity and applications may lower the security posture of both mobile device 102 and the enterprise system 100 to which mobile device 102 is connected.

Each mobile device 102 may transmit information over a communications network 104, such as the Internet. Other communications technology for mobile device 102 may include, but are not limited to, any combination of wired or wireless digital or analog communications channels, such as phone systems (e.g., cellular, RF, or IP-based). These communications technologies can include Ethernet, Wi-Fi, BLUETOOTH, and other wireless radio technologies. The network 104 can include, for example, a cellular phone network, a local area network (LAN), a wide area network (WAN), the Internet, or combinations thereof.

Mobile device 102 can be any communications device for sending and receiving voice, video, or data, for example, a smartphone, tablet or laptop computer, a wired or wireless machine, device, or combinations thereof. Mobile device 102 can also be any portable media device such as a network connected digital camera, media player, or another portable media device. These devices may be configured to send and receive voice or data through a cellular network 104, web browser, dedicated application, or other portal.

Mobile device 102 and server 106 can be or can include computers running ANDROID, BLACKBERRY OS, MICROSOFT WINDOWS, WINDOWS PHONE, MAC iOS, UNIX, LINUX or another operating system (OS) or platform. Mobile device 102, server 106, and components residing therein may include a communications interface. A communication interface may allow mobile device 102 to connect directly, or over network 104, to another mobile device, server 106 or device. In some embodiments, mobile device 102 can be connected to another mobile device, server, or device via a wireless interface.

As shown in FIG. 1, enterprise system 100 may include server 106 and analysis framework 110 that forensically analyzes mobile device 102. In some embodiments, analysis framework 110, enterprise database 112, and storage space 114 reside on different servers other than server 106. The combination of analysis framework 110, enterprise database 112, and storage space 114 may forensically analyze mobile device 102 on a periodic basis. Embodiments of the described systems and methods may employ numerous distributed servers and mobile devices to provide architecture that constitutes enterprise system 100.

In some embodiments, parts of analysis framework 110, enterprise database 112, and storage space 114 may be distributed across several servers, mobile devices, or combinations thereof. The server of these components or server 106, or mobile device 102 may each include an input interface, processor, memory, communications interface, output interface, or combinations thereof, interconnected by a bus. The memory in these components may include volatile and non-volatile storage. For example, memory storage may include a solid-state drives (SSD), a read only memory (ROM) in a hard disk device (HDD), random access memory (RAM), and the like. The OS and application programs of mobile devices may be stored on SSD.

Specific program modules that implement embodiments of the described systems and methods may be incorporated in application programs on server 106 or mobile device 102. The program modules may execute under control of an OS, as detailed above. When stored on server 106, embodiments of analysis framework 110, enterprise database 112, and storage space 114 can function and be maintained in a manner that is substantially, or totally, transparent to a user of mobile device 102.

As shown in FIG. 1, information about snapshot images from mobile device 102 is sent over communications network 102 (such as the Internet) or through another networked facility (such as an intranet) or from a dedicated input source, or combinations thereof. In some embodiments, applications that are installed on mobile device 102 can originate from a wide variety of sources, such as commercial servicers operated by carriers or third party vendors.

Under control of the OS, application programs that run on mobile device 102 or server 106 exchange commands and data with external sources, via a network connection or USB connection to transmit and receive information during execution of analysis framework 110, enterprise database 112, and storage space 114.

Server 106 or mobile device 102 may be connected to input devices, such as a keyboard or mouse. A display, such as a conventional color monitor, and printer, such as a conventional laser printer, may also be connected to output interfaces. The output interfaces provide requisite circuitry to electrically connect and interface the display and printer to the server 106 or mobile device 102. Through these input and output devices, a user can access and install applications on mobile device 102.

Analysis framework 110, enterprise database 112, or storage space 114 may be embodied in a product that a cellular telephone carrier can install on its platform. The combination of these components can forensically analyze mobile devices 102 on a recurring schedule, such as a previous day's changes, for example. Then, after using these components, an enterprise administrator can block a mobile device from accessing enterprise system 100 when malicious activity has been suspected.

Client-side application 108, analysis framework 110, enterprise database 112, or storage space 114 could be embodied as JAVA tools, which means that they can run on any platform that is JAVA enabled. Embodiments of these components can run on servers that provide websites for administrators to access these components remotely over network 104. Anyone with administrative access to server 106 can connect to, and use, visualization tools provided by the PMF system. These components can run on any type of server, including virtual servers or actual machines, and can be designed to operate in any computing environment because they have very few requirements for underlying hardware and operating systems.

The PMF system may be embodied on a distributed processing system to break processing apart into smaller jobs that can be executed by different processors in parallel. The results of the parallel processing could then be combined once completed. In some embodiments, features of server 106 can be provided to enterprise system 100 as a subscribed service.

In some embodiments, different forensic tools and techniques can be combined to operate in an enterprise system and use live forensic analysis because they rely on a target mobile device's running kernel. The systems and methods may incorporate commercially available tools and kits because the resulting reconstructed images are valid images that a variety of tools and kits support. In some embodiments, the forensics tools can identify an action taken by a malicious user or application that attempts to circumvent PMF measurements by modifying a running kernel.

The systems and methods described herein send small updates of data from the mobile device 102 over-the-air (OTA) on enterprise systems to server 106. The enterprise database 112 stores changed data from across the population of mobile devices only once. The PMF system gains significant speed and efficiency due to this de-duplication.

The market for mobile forensic tools and techniques has grown as mobile devices include capabilities that rival conventional computers. Mobile operating systems now support and use file systems found in conventional desktop computers. PMF thus incorporates forensic techniques on mobile devices that can readily be used on conventional computers. For example, PMF can identify added, modified, and deleted files in a file system on many different types of mobile devices.

In some embodiments, PMF detection methods can use forensic tools to produce Digital Forensics Extensible Markup Language (DFXML). DFXML is an XML schema that allows for interoperability between different forensics tools. The use of DFXML allows PMF processes to pass data into the analysis framework 110, enterprise database 112, and storage space 114 architecture, and analyze it in a standard way.

In some embodiments, the systems and methods include components that look for malware that, when installed and executed, would establish persistence on a mobile device to survive a reboot operation. The systems and methods can detect malware that could use modified system, boot, or bootloader images to install persistence mechanisms or execute its malicious payload. In some embodiments, the systems and methods detect a modified boot image that abuses kernel structures that exploit Universal Serial Bus (USB) connectivity between a USB client and a USB host.

II. Periodic Mobile Forensics

The periodic mobile forensics (PMF) system may include components on each mobile device 102 and server 106. The components of the server 106 collectively conduct a forensics analysis of each mobile device 102. Client-side application 108 may be a local application that resides on each mobile device 102 to perform periodic scans of blocks of data in memory. The blocks of data include partitions of memory on a mobile device 102. The scanning may be executed periodically as a daemon such that it is a background process that operates transparently to users of each mobile device 102. This means that the users may not be aware of the operation of the application. The scans identify information about changes to specific blocks of data, which may correspond to file system structures. The information may include a series of changed bits, locations of offsets and collection times of the changes to the file system. The information about the changed blocks of data is stored by client-side application 108 in a local database on mobile device 102.

At least a portion of the information about changes to the file systems of mobile device 102 is sent to server 106 over network 104 after client-side application 108 executes a scanning operation to collect the information and other conditions are satisfied. In some embodiments, the information is sent to server 106 after client-side application 108 finishes the scanning operation. In some embodiments, sending the information from mobile device 102 to server 106 occurs during a period when mobile device 102 is able to connect to server 106 over a Wi-Fi connection to reduce data costs imposed by telephone carriers. In other embodiments, the information is sent over a mobile wireless connection.

Client-side application 108 sends copies of the information about the changed blocks of data to enterprise database 112 on server 106 for storage. In some embodiments, the data is transformed during transmission and storage using compression, encoding, encryption, and serialization, or some combination of. The changed blocks of data are referenced by collection times, which may include the times that the data was collected by the client-side application 108 to send to the enterprise database 112. The information about the changes to the blocks of data may be sent to server 106 periodically according to a schedule, on demand, or whenever certain communications methods become available, such as Wi-Fi.

An initial image, or baseline image, is generated for each unique hardware and operating system version in use on the enterprise population of devices. This baseline image is stored on enterprise database 112 prior to using mobile device 102. The system can reconstruct bit-for-bit copies of each block of data for each mobile device 102 retrieved at a given collection time. Each time-stamped reconstruction may also be referred to as a particular image snapshot. The information collected from client-side application 108 concerning the changed blocks of data is used to reassemble complete images at server 106. The changed blocks of data collected from mobile device 102 are overlaid on the baseline image in succession with the changes of the desired snapshot of time T being the last to overlay. The reconstruction of any particular snapshot image occurs within storage space 114.

Analysis framework 110 can conduct a forensics analysis by comparing a reconstructed snapshot image for mobile device 102 to an earlier snapshot, the most recent snapshot, or the baseline image. A framework of forensic tools and techniques are run on a target snapshot image to identify malicious artifacts. These tools and techniques can detect changes to areas of memory in a mobile device 102 and can reconstruct and analyze added, deleted, and modified artifacts from the mobile device's file systems. An example analysis includes identifying malicious activity based on the locations of offsets of block data. In some embodiments, the blocks of data may be represented by hash values. The malicious activity may include an application or user that is attempting to infiltrate an enterprise system. In some embodiments, the reconstructed blocks of data may be used to visualize changes on important file systems.

Results of a forensics analysis executed by analysis framework 110 can be stored in enterprise database 112 on server 106 and used to setup additional forensics analysis. In some embodiments, an audit output generated from these forensic analyses can be sent to an auditing system such as SPLUNK, ARCSIGHT or another event-management solution, for additional forensics analysis with other enterprise sources.

Figure 2:
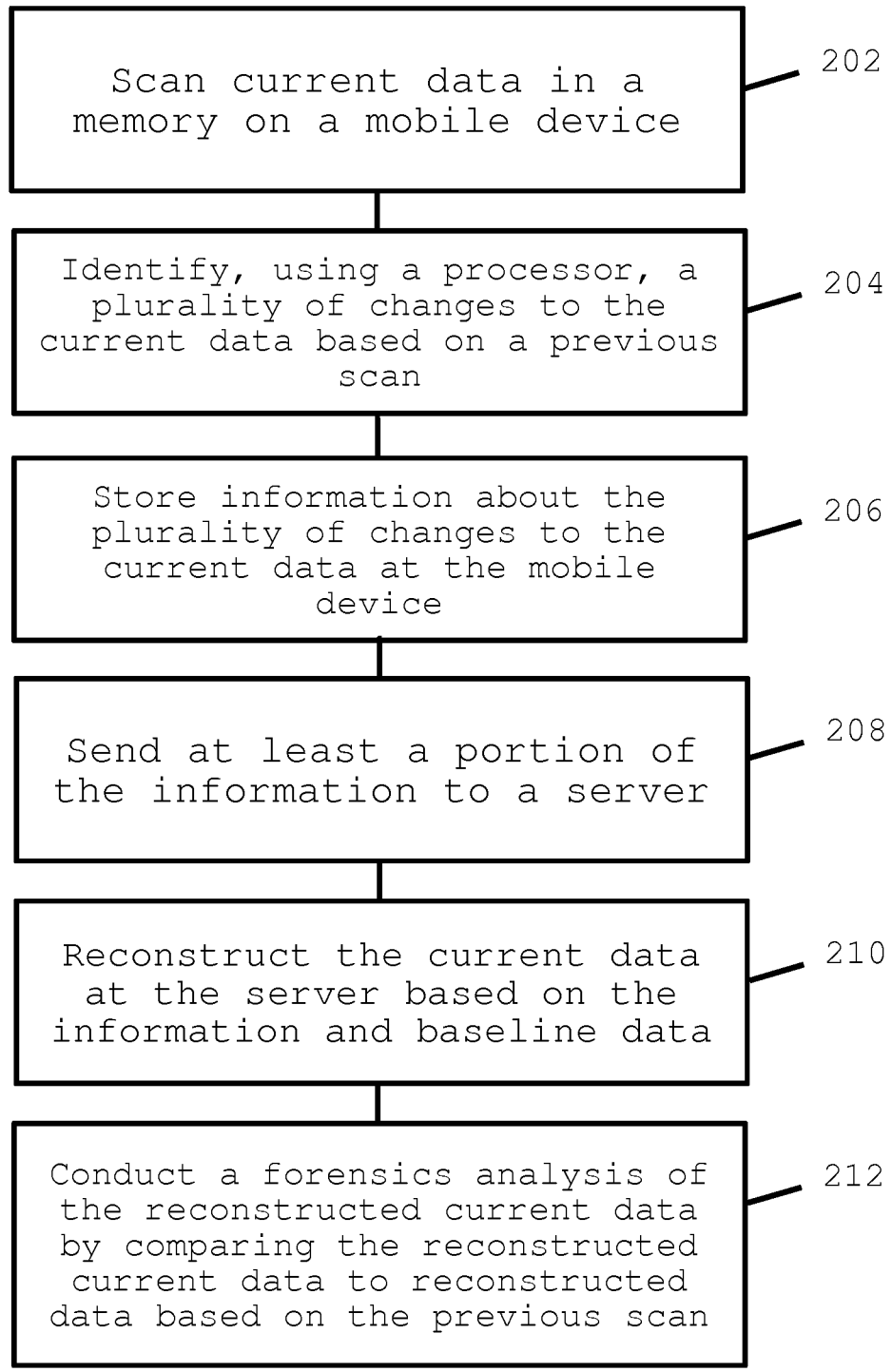
FIG. 2 is a flowchart showing a method for conducting a forensics analysis of an enterprise mobile device, according to some embodiments.

FIG. 2 is a flowchart showing a method for conducting a forensics analysis of a mobile device, according to some embodiments. At step 202, client-side application 108 scans current data in a memory on mobile device 102. At step 204, a processor of mobile device 102 identifies a plurality of changes to the current data based on a comparison to a previous scan. The information about the plurality of changes to the current data is then stored at mobile device 102, according to step 206. At least a portion of the information about the changes is sent to server 106, according to step 208. At step 210, the current data is reconstructed at server 106 based on the received information, previous changes received, and baseline data. Finally, at step 212, server 106 conducts a forensics analysis of the reconstructed current data by comparing the reconstructed current data to reconstructed data based on the previous scan.

Figure 3:
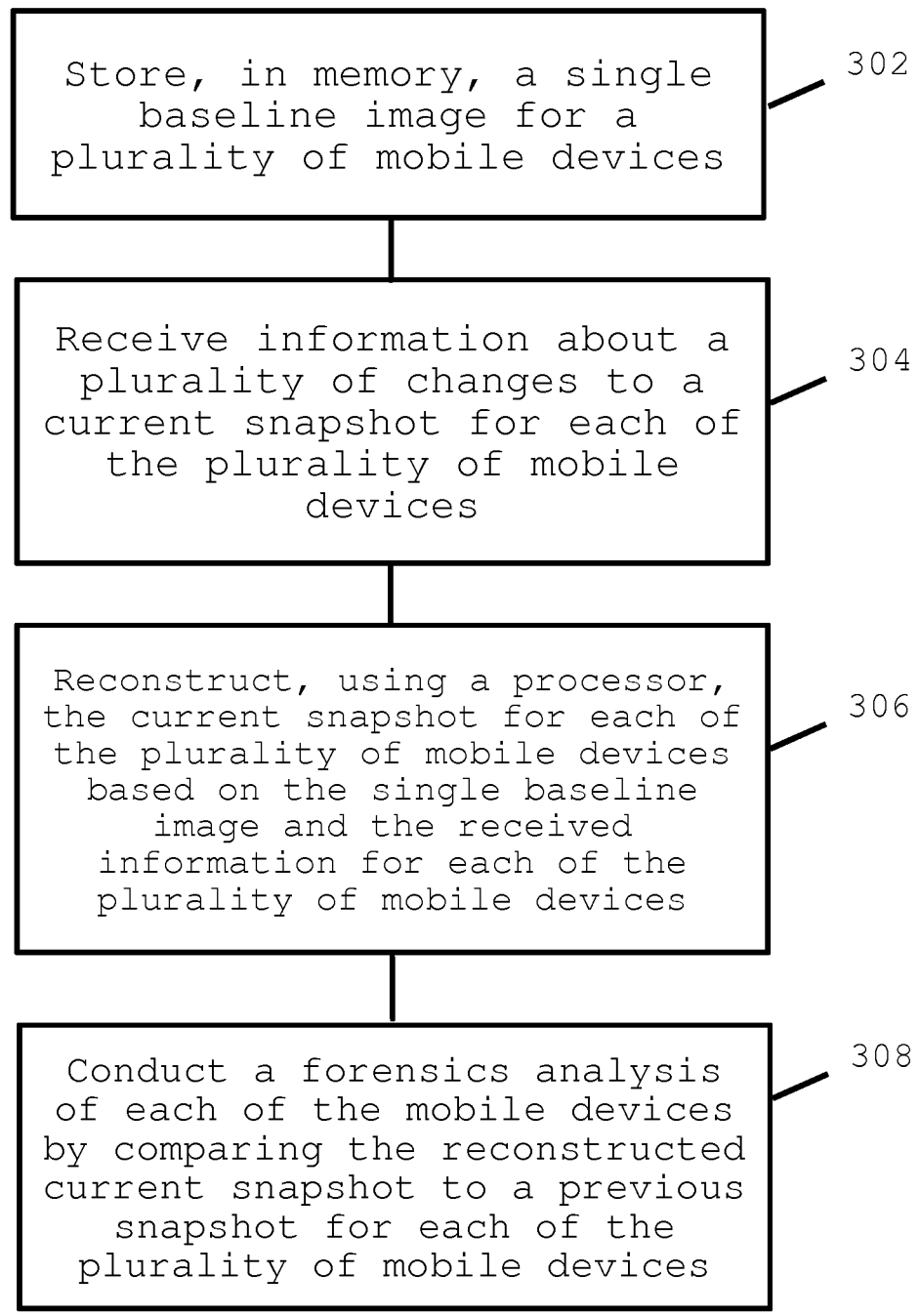
FIG. 3 is a flowchart showing a method for conducting a forensics analysis of a plurality of mobile devices in an enterprise system, according to some embodiments.

FIG. 3 is a flowchart showing a method for conducting a forensics analysis of a plurality of mobile devices in an enterprise system, according to some embodiments. At step 302, a single baseline image for a plurality of mobile devices is created and stored in memory. At step 304, enterprise database 112 receives information about a plurality of changes for a given time for each of the plurality of mobile devices. At step 306, a processor of server 106 is used to reconstruct the current snapshot for each of the plurality of mobile devices based on the baseline image and the received information for each of the plurality of mobile devices. At step 310, analysis framework 110 conducts a forensics analysis of each of the mobile devices by comparing the reconstructed current snapshot to a previous snapshot for each of the plurality of mobile devices.

1. Client-Side Components

A client-side application 108 may reside on mobile device 102. Client-side application 108 operates as a background process on mobile device 102. In some embodiments, the background process is a daemon process. A daemon is a background process that handles requests for services, and is dormant when not required. A daemon used as client-side application 108 may be started by an initialization process during boot-up of mobile device 102. This allows client-side application 108 to have privileges to read blocks of data on the mobile device 102. In some embodiments, client-side application 108 does not require starting a boot-up of mobile device 102.

Client-side application 108 identifies offsets of changed bits on blocks of data on mobile device 102 since its last runtime by comparing a series of bits of a configurable size to a previous measurement stored in a local database. In some embodiments, the series of bits may be stored as hash values, such as a SHA256 hash, and the database may be SQLite. In some embodiments, information obtained by executing client side application 108 is stored in volatile memory. If a series of bits at a specific offset and size have different hash values compared to the last time they were scanned, the offset may be marked in the local database. At a later time, after certain conditions are satisfied, the marked offsets are queried to collect changed data. The changed data, location of offsets, and time the collection, and other relevant information was collected may include some of the information that is subsequently sent to server 106.

Client-side application 108 on mobile device 102 can connect to server 106 over network 104 to communicate the information about the changed blocks of data. Mobile device 102 may initiate a secure, authenticated communications with server 106. The changed series of bits from the block data are copied over network 104 to enterprise database 112 on server 106 for de-duplication, storage, and forensic analysis.

In some embodiments, client-side application 108 may also capture changes to volatile memory of mobile device 102, where decryption keys may reside, in order to decrypt certain files later during image reconstruction and analysis. In some embodiments, client-side application 108 can dynamically identify unencrypted mount points when they exist and extract their contents for later analysis.

2. Server-Side Components

Components of the PMF system on server 106 may listen on a negotiable port via Hypertext Transport Protocol Secure (HTTPS) for information from mobile device 102. Client-side application 108 of mobile device 102 can perform server authentication by examining a server 106 certificate. A secure connection between mobile device 102 and server 106 can then be established over network 104 to transmit information between the two devices.

In particular, the PMF system listens for incoming information, including a series of changed bits, from mobile device 102 and then stores the information in enterprise database 112 at server 106. Enterprise database 112 may provide the necessary information concerning a file system of mobile device 102 to reconstruct snapshot images on a storage space 114. Analysis framework 110 may then execute in storage space 114 to reconstruct a snapshot image of mobile device 102. A current snapshot image is generated by assembling sequential blocks of data from mobile device 102.

Figure 4:
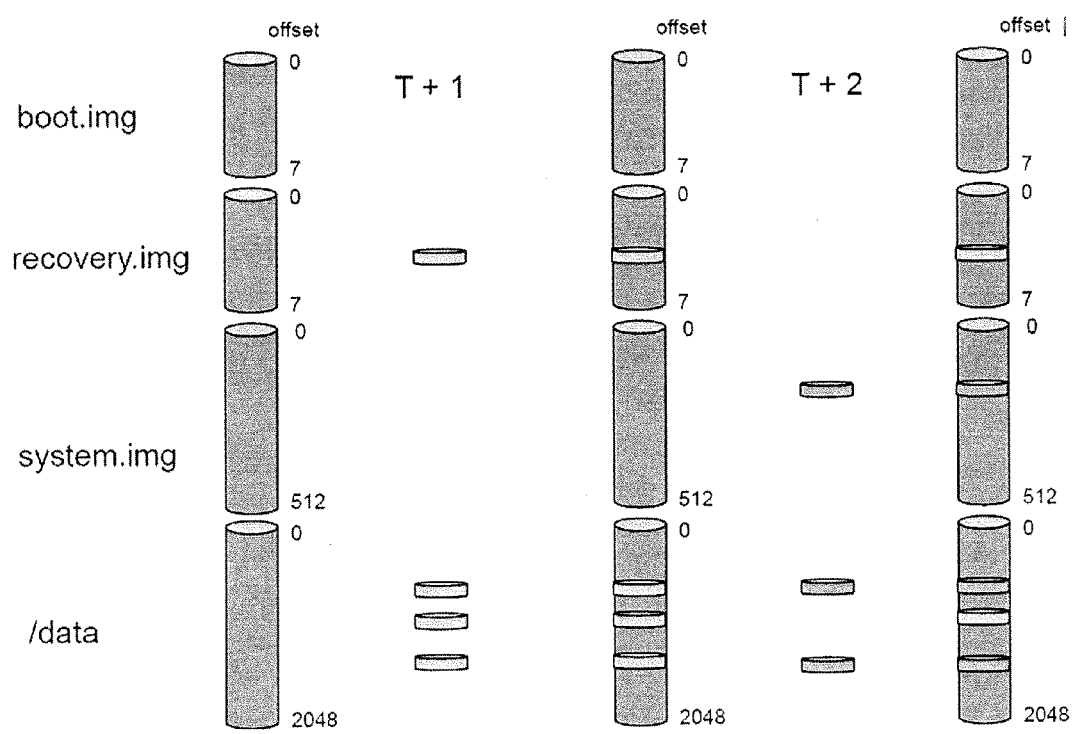
FIG. 4 depicts a reconstruction of snapshot images of a mobile device based on changed data offsets, according to some embodiments.

FIG. 4 depicts reconstructions of partitions that are critical to the successful or regular operation of mobile device 102 based on changed data offsets, according to some embodiments. In particular, FIG. 4 shows a file structure comprising boot, recovery, system and user data partitions. The left-most file structure shows a set of baseline images at time T. The reconstruction depicted in the center of FIG. 4 includes offsets and changes that are incorporated into the baseline images based upon data collected at time T+1. The right-most reconstructed depicted in FIG. 4 shows changed data that is incorporated into the baseline images with the changes from the collection at time T+1 as well as the changes at time T+2.

3. Analysis Framework

Server 106 may include analysis framework 110. The PMF system uses analysis framework 110 to automatically run a series of dynamic forensic processes. The processes can detect changes to storage on mobile device 102 and can reconstruct and analyze added, deleted, and modified artifacts from the mobile device's file systems. In some embodiments, the forensics processes may be manually run by an administrator. The forensics processes output events that are used to detect malicious activity. In some embodiments, the forensic processes may be referred to as detectors or loggers. The forensic processes are executed on a snapshot image of mobile device 102 that has been reconstructed in storage space 114.

In some embodiments, analysis framework 110 manages storage space 114 by reusing previously reconstructed images to detect events corresponding to malicious activity. Analysis framework 110 identifies changes to file system partitions and an administrator can use that information to visualize those changes across a partition. Changes to a file system that should otherwise rarely occur are detected, and generate corresponding event data. In some embodiments, analysis framework 110 detects persistence mechanisms in applications that would allow the applications to restart after a reboot of mobile device 102. In other words, these applications remain embedded in the kernel and file system after mobile device 102 has been rebooted. In some embodiments, analysis framework 110 detects files that have been added, modified, or deleted to a file system by newly installed applications. Any of these detected events may be recorded in enterprise database 112 and used to determine a probability that malicious activity has occurred to a particular enterprise mobile device.

Forensic processes may execute to analyze reconstructed blocks of data of a snapshot image in the order in which the blocks are imported into analysis framework 110. In some embodiments, the forensic processes are techniques that identify malicious activities as events and/or the forensic processes simply record events that may or may not be malicious. Event data may be further processed by a subsequent process, or may provide the basis for human analysis. Each forensic process can run dynamically within analysis framework 110. In some embodiments, analysis framework 110 is modular so that forensic processes can be added or removed from analysis framework 110 at any time.

In some embodiments, forensic processes identify malicious applications as they are installed or when they deliver their malicious payloads. In some embodiments, forensic processes identify an authorized user who is misusing mobile device 102. In some embodiments, forensic processes identify an unauthorized user masquerading as an authorized user who is using mobile device 102. In an enterprise setting, any process that provides escalated privileges to non-administrative users may violate enterprise policies and may damage an enterprise's overall security such that it should be detected as an event by analysis framework 110. Thus, any change to a file system may be recognized as an event by analysis framework 110. The events are used to identify malicious activity that includes malware and inadvertent or intentional changes to file systems that are critical to operation of mobile device 102.

The systems and methods described herein allow the PMF system to log and detect events that occur on mobile devices. The mechanisms can effectively detect changes to partitions of mobile device 102 and can reconstruct and analyze added, deleted, and modified artifacts from the mobile device's file systems. Examples of embodiments of forensic processes are described as, but not limited to, the following:

A "system changes" process identifies changes to the system image of mobile device 102. Changes to system files may correspond to new binaries or applications that have been installed on mobile device 102. In some embodiments, these changes indicate that malicious applications are establishing persistence on mobile device 102.

A "boot changes" process identifies changes to a boot image of mobile device 102. This process identifies changes that occurred in a kernel or initial ramdisk of mobile device 102, which contain the device's root file system and core system files. Malicious applications can modify the kernel in a targeted attack to make the kernel behave differently. Malicious applications can also modify core startup files and add files to the root file system that could survive a reboot. Thus, this process identifies events that indicate that a malicious application has been installed on mobile device 102.

A "bootloader changes" process identifies changes to a bootloader image of mobile device 102. In an enterprise context, observed unplanned changes to the bootloader should rarely happen; therefore, this kind of change is almost always considered malicious.

A "recovery changes" process identifies changes to a recovery image of mobile device 102. The recovery image holds a kernel and a root file system when mobile device 102 is booted into recovery mode. Changes to the recovery image may not indicate malicious behavior because, for example, changes may be due to a user installing a custom recovery image to enable backup and restoring functionality. However, such changes may be undesired by an enterprise because this supplies the enterprise mobile device population or malicious attackers with elevated privileges to areas of mobile device storage that are typically protected while a mobile device is running in normal mode.

A "File MAC(E) changes" process executes a forensic tool to output any modified, accessed, or created time (MAC(E)) changes to any files on the mobile device 102. The resulting log output is time-stamped based on modified, accessed, created and entry modified (MAC(E)) times and stored in enterprise database 112 at server 106.

A "Deleted file" process executes a forensic tool and processes the results to output any observed deleted files since the last snapshot time T. The resulting log output is time-stamped based on MAC(E) times and is stored in enterprise database 112. If any seemingly legitimate application contains exploit files in its assets directory and subsequently writes them to the file system of mobile device 102, executes them, and deletes them, this logger will log the existence of any remnants of the deleted exploit files on the file system of mobile device 102.

An "Installed application" process observes package files installed on mobile device 102 since a last snapshot time. This process acts by first identifying an application file's installation directory, and then extracts the application files in the package. Once the application files have been extracted, the resulting AndroidManifest.xml file is parsed and inspected for the presence of a "boot complete" event registration, for example. If a "boot complete" event registration is not found, the process will simply log the installation of a new application. The "boot complete" event registration tends to be used by most malicious applications, but is used less frequently by legitimate applications. Thus, detecting a "boot completed" event registration may be a good way to detect and identify malicious applications.

The seven forensic processes described above are merely representative of the types of any number of forensics processes that can be used by analysis framework 110 of the PMF system to detect malicious activity on mobile device 102. In general, any forensics process that detects a particular change to a file system of mobile device 102 may be used to determine whether or not malicious activity has occurred. Forensics processes of analysis framework 110 can process any data stored in enterprise database 112 or reconstructed snapshots of mobile device 102 in storage space 114. In some embodiments, an audit table located at server 106 records the outputs from forensic processes for subsequent analysis.

In some embodiments, the forensic process outputs can be combined during forensics analysis to increase a likelihood of accurately detecting malicious activity. For example, checking for the existence of a "boot complete" event registration may be more effective when combined with other forensic output. In some embodiments, processes that identify the "boot complete" event registration feature can be used in conjunction with processes of additional features. In some embodiments, the "Installed Application" process output may be suitable for use in combination with other detection features inside of a machine learning classifier.

In some embodiments, analysis framework 110 includes a forensics process to identify an application installed on any persistent storage of mobile device 102. This permits for analyzing all applications stored at mobile device 102 for malicious activity. This includes applications installed on SD cards in mobile device 102. Thus, the periodic mobile forensics system may identify and examine new applications installed to the SD card to detect malicious activity.

In some embodiments, other application installation locations including /vendor/app, /data/app-private, and /system/framework, are implemented in the periodic mobile forensics analysis to ensure that all application installations are logged. In some embodiments, an effective forensics analysis for identifying changes to file systems on mobile device 102 may be limited to persistent storage. In some embodiments, the forensics analysis may include detectors that analyze changes in volatile memory to identify malicious activity. In yet other embodiments, the forensics analysis may include combinations of volatile and non-volatile memory in mobile device 102.

4. Enterprise Database

Server 106 may include enterprise database 112. The PMF system uses enterprise database 112 to store collected bits of data from mobile device 102 and to store events output from forensic processes executed by analysis framework 110. Enterprise database 112 may be a relational database that eliminates duplication of bits of data from a population of enterprise mobile devices. This can be achieved by, for example, storing a single set of baseline images for a population of enterprise mobile devices. This reduces an amount of storage space required for each mobile device in an enterprise system because mobile devices of similar model and vendor types can reference the same baseline images.

Using enterprise database 112 can increase memory efficiency by storing only changes at given time T of a population of enterprise mobile devices, rather that storing multiple complete images for each mobile device. Since only changed data for all mobile devices may be stored in enterprise database 112, this further reduces the total amount of storage space required for each mobile device in an enterprise. For the reasons detailed above, any snapshot image of mobile device 102 can be reconstructed at server 106 by using a baseline image and information collected describing subsequent changes to snapshot images from a mobile device 102 in an enterprise system. The information may include a series of changed bits and related metadata. The metadata may include the locations of the changed bits and collection times of the changed bits that correspond to a particular snapshot. The information may include the actual changes to a snapshot image and metadata about those changes. In some embodiments, the enterprise database 112 stores and organizes needed metadata including offset locations to enable an analyst to visualize the patterns of changes across a large file system.

Thus, the PMF systems and methods described herein are flexible, efficient and compatible across any mobile device to provide a secure monitoring architecture for enterprise systems. As different platforms for mobile devices continue to increase in popularity across all industries, so will the stakes and risks posed to enterprises by malware and malicious users. Periodic mobile forensics offers ways of detecting malicious applications as they are installed on mobile devices, or as they deliver their malicious payloads, and ways of detecting both authorized and unauthorized users who are attempting to disrupt enterprise systems.

Although various embodiments, each of which incorporates the teachings of the present invention, have been shown and described in detail herein, those skilled in the art can readily devise many other embodiments that still utilize these teachings. The various embodiments described above have been presented for purposes of illustration and description. They are not intended to be exhaustive or to limit the invention to the precise forms disclosed, and many modifications and variations are possible in light of the above teachings. For example, periodic mobile forensics can be applied to any device where it would be beneficial to determine changes to any file systems. The invention can be construed according to the claims and their equivalents.

The invention claimed is:

1. A method for analyzing data on a plurality of mobile devices, comprising:
for each of the plurality of mobile devices:
scanning current data in memory on a respective mobile device and generating a plurality of hash values based on the current data, wherein each hash value is generated for a respective block of data of the current data,
identifying, using a processor of the respective mobile device, a plurality of changes in the current data of the respective mobile device based on a previous scan of the respective mobile device by identifying changes in the plurality of hash values relative to hash values generated in the previous scan and marking offsets for blocks of data having changed hash values in a database,
after identifying the plurality of changes and marking the offsets for the plurality of changes, querying the marked offsets to collect information about the plurality of changes,
storing the information about the plurality of changes in the current data at the respective mobile device, wherein the information comprises at least one block of data having at least one changed bit and a location within the current data of the at least one block of data having the at least one changed bit,
sending the information to a server,
reconstructing the current data of the respective mobile device at the server based on the information about the plurality of changes in the current data of the respective mobile device and baseline data, wherein the baseline data is a single image representing an initial state of the plurality of mobile devices stored at the server, and
analyzing the plurality of changes in the current data of the respective mobile device at the server by comparing the reconstructed current data of the respective mobile device to reconstructed data of the respective mobile device based on the previous scan of the respective mobile device.

2. The method of claim 1, wherein the baseline data is stored at the server before current data is scanned in the plurality of mobile devices.

3. The method of claim 1, wherein the reconstructed current data comprises the baseline data overlaid and replaced by the at least one block of data having the at least one changed bit.

4. The method of claim 1, wherein the scanning is executed automatically periodically as a daemon process, and the sending of the information about the plurality of changes to the current data occurs periodically.

5. The method of claim 1, wherein the current data comprises file systems.

6. The method of claim 5, wherein the analysis comprises detecting malicious activity as changes to critical file systems.

7. The method of claim 6, further comprising displaying the critical file systems based on the reconstructed file systems on a display at the server.

8. A method for conducting an analysis of a plurality of mobile devices in an enterprise system, comprising:
storing, in memory, a single baseline image for a plurality of mobile devices, wherein the single baseline image represents an initial state of the plurality of mobile devices,
receiving information about a plurality of changes in a current snapshot for each of the plurality of mobile devices, wherein information about a plurality of changes in a current snapshot for a respective mobile device comprises at least one block of data having at least one changed bit and a location of the at least one block of data having the at least one changed bit, and wherein the at least one block of data having the at least one changed bit is identified by the respective mobile device by identifying changes in hash values of a current scan of the respective mobile device relative to a previous scan of the respective mobile device, marking offsets for blocks of data having changed hash values in a database, and after identifying the plurality of changes and marking the offsets for the plurality of changes, querying the marked offsets to collect the information about the plurality of changes,
reconstructing, using a processor, the current snapshot for each of the plurality of mobile devices based on the single baseline image and the received information for each of the plurality of mobile devices, and
conducting an analysis of each of the mobile devices by comparing the reconstructed current snapshot to a reconstructed previous snapshot for each of the plurality of mobile devices.

9. The method of claim 8, wherein the snapshot is a record of exact contents of a storage location or file system in the mobile device at a given time.

10. The method of claim 8, wherein the at least one block of data having the at least one changed bit is de-duplicated and stored at the server as a plurality of hash values.

11. The method of claim 8, wherein the information is automatically retrieved from each of the plurality of mobile devices periodically.

12. The method of claim 8, wherein the current snapshot comprises file systems and the analysis comprises detecting malicious activity as changes to critical file systems.

13. A system for analyzing data on a mobile device, comprising a plurality of mobile devices and a hardware server, wherein:

each of the plurality of mobile devices comprises:

a hardware processor that scans current data in memory on a respective mobile device, generates a plurality of hash values based on the current data, wherein each hash value is generated for a respective block of data of the current data, identifies a plurality of changes to the current data of the respective mobile device based on a previous scan of the respective mobile device by identifying changes in the plurality of hash values relative to hash values generated in the previous scan, marks offsets for blocks of data having changed hash values, and after identifying the plurality of changes and marking the offsets for the plurality of changes, querying the marked offsets to collect information about the plurality of changes, and a memory location that stores the information about the plurality of changes to the current data of the respective mobile device collected by the processor, wherein the information comprises at least one block of data having at least one changed bit and a location of the at least one block of data having the at least one changed bit, and the hardware server is configured to:

receive the information from each of the plurality of mobile devices, reconstruct the current data of each of the plurality of mobile devices based on, for a respective mobile device, the information about the plurality of changes to the current data of the respective mobile device and baseline data, wherein the baseline data is a single image representing an initial state of the plurality of mobile devices stored at the hardware server, and compare the reconstructed current data of a respective mobile device to reconstructed data of the respective mobile device based on the previous scan of the respective mobile device.

14. The system of claim 13, wherein the reconstructed current data comprises the baseline data overlaid by the block of data containing at least one changed bit.

15. A system for analyzing a plurality of mobile devices in an enterprise system, comprising:

a memory that stores a single baseline image for a plurality of mobile devices, wherein the single baseline image represents an initial state of the plurality of mobile devices, and a hardware processor configured to:

receive information about a plurality of changes to a current snapshot for each of the plurality of mobile devices, wherein information about a plurality of changes in a current snapshot for a respective mobile device comprises at least one block of data having at least one changed bit and a location of the at least one block of data having the at least one changed bit, and wherein the at least one block of data having the at least one changed bit is identified by the respective mobile device by identifying changes in hash values of a current scan of the respective mobile device relative to a previous scan of the respective mobile device, marking offsets for blocks of data having changed hash values in a database, and after identifying the plurality of changes and marking the offsets for the plurality of changes, querying the marked offsets to collect the information about the plurality of changes, reconstruct the current snapshot for each of the plurality of mobile devices based on the single baseline image and the received information for each of the plurality of mobile devices, and analyze each of the plurality of mobile devices by comparing the reconstructed current snapshot to a previous snapshot for each of the plurality of mobile devices.

16. The system of claim 15, wherein the at least one block of data having the at least one changed bit is visualized at a server as a plurality of ordered hash values.

* * * * *